US005369424A

United States Patent [19]

Hori et al.

[11] Patent Number: 5,369,424

[45] Date of Patent: Nov. 29, 1994

[54] IMAGE-FORMING APPARATUS

[75] Inventors: Setsuo Hori, Izumi; Kikunosuke Tsuji, Izumiohtsu; Tatsuya Kikumura, Settsu; Kenichi Satake, Osaka, all of Japan

[73] Assignee: Mita Industrial Co., Ltd., Osaka, Japan

[21] Appl. No.: 888,924

[22] Filed: May 27, 1992

[30] Foreign Application Priority Data

Jun. 6, 1991 [JP] Japan .................................. 3-163660
Jun. 29, 1991 [JP] Japan .................................. 3-185554

[51] Int. Cl.5 .............................................. G01D 15/24

[52] U.S. Cl. .................................... 346/134; 271/193; 271/182; 347/101

[58] Field of Search ........................... 346/140 R, 134; 271/193, 182; 355/274, 275; 226/94

[56] References Cited

U.S. PATENT DOCUMENTS 4,442,439 4/1984 Mizuno ........................... 346/140 R
4,978,118 12/1990 Kasahara ........................ 271/193 X
5,003,325 3/1991 Bibl ................................ 271/193 X
5,225,853 7/1993 Kobayashi et al. ............. 346/140 R

FOREIGN PATENT DOCUMENTS 03-179377 8/1991 Japan .................................. 355/275

*Primary Examiner*—Benjamin R. Fuller
*Assistant Examiner*—John Barlow
*Attorney, Agent, or Firm*—Wenderoth, Lind & Ponack

[57] ABSTRACT

Conveying devices, operation of which is stopped during printing, are provided upstream and downstream, as seen in a direction of conveying of a paper, of a platen arranged to face a printing head. The platen is provided with an electrostatic attraction member electrostatically the paper by the application of a voltage. A first control applies the voltage to the member during printing until a leading end of the paper arrives at the downstream conveying device. A second control applied the voltage to the member during printing after conveyance of a trailing end of the paper by the upstream conveying device is completed. Thereby, lifting of the end portions of the paper away from the platen is prevented, thus avoiding unprintable margins at such end portions of the paper.

20 Claims, 9 Drawing Sheets

IMAGE-FORMING APPARATUS

BACKGROUND OF THE INVENTION

1. Field of the Invention

The present invention relates to an image-forming apparatus employed in a printer and the like.

2. Description of the Prior Art

In a printer for example, an interval between a printing surface of a paper conveyed to a printing portion of a printing head and such printing portion is required to be maintained very closely to about 1 mm. However, if the printing surface of paper lifts or moves in a printing zone toward the printing head, printing is disturbed and thus the quality of printing cannot be guaranteed. Therefore, conveying means devices are arranged at the upstream and downstream sides, in a conveying direction of the paper, of the printing head so that printing occurs with the conveying devices maintaining the interval between the printing portion and the printing surface, and printing is finished immediately before conveyance of the trailing end of the paper by the upstream conveying device is released.

However, in such the paper conveying arrangement, a leading end portion of the paper before the leading end of the paper arrives at the downstream conveying device and a trailing end portion of the paper after conveyance of the trailing end of the paper by the upstream conveying device is finished are unable to be printed. That is, such portions are unprintable margins, and this situation is wasteful.

If it is attempted to print such portions by increasing the number of nozzles, the nozzle head becomes large sized due to the size of piezo-elements employed as ink pressure sources of the respective nozzles. Thereby, distances between the upstream conveying device and the printing head and between the downstream conveying device and the printing head are increased. Accordingly, the sizes of the unprintable margins are increased with an increase of the number of nozzles.

In a case where the paper to be printed is, for example, a so-called inter-office letterhead with a company name, company crest and the like printed on the leading end portion (or the trailing end portion) thereof, then printing at such portion is not required, although printing at the opposite end portion might be desired.

SUMMARY OF THE INVENTION

It is an object of the present invention to provide an image-forming apparatus capable of eliminating an unprintable margin on at least one of a leading end portion and a trailing end portion of a paper sheet.

It is a more specific object of a first aspect of the invention to provide an image-forming apparatus capable of eliminating an unprintable margin at the leading end portion of the paper.

Further, it is an object of a second aspect of the invention to provide an image-forming apparatus capable of eliminating the unprintable margin at the trailing end portion of the paper.

Finally, it is an object of a third aspect of the invention to provide an image-forming apparatus capable of eliminating the unprintable margins at both the leading end portion and the trailing end portion of the paper.

In order to achieve the above described objects, the first aspect of the invention provides an image-forming apparatus wherein conveying devices, conveyance by which is stopped during printing, are arranged on upstream and downstream sides, in a conveying direction of a paper, of a platen arranged to face a printing head. The platen is provided with an electrostatic attraction member electrostatically attracting the paper by application of a voltage. A first control applies the voltage to the electrostatic attraction member during printing until a leading end of the paper arrives at the downstream conveying device.

The second aspect of the invention provides a second control to apply the voltage to the electrostatic attraction member during printing after completion of conveyance of a trailing end of the paper by the upstream conveying device.

The third aspect of the invention provides both the first control to apply the voltage to the electrostatic attraction member during printing until the leading end of the paper arrives at the downstream conveying device and the second control to apply the voltage to the electrostatic attraction member during printing after the completion of conveyance of the trailing end of the paper by the upstream conveying device.

According to the first aspect of the invention, the printing of the leading end portion of the paper during the time before the leading end of the paper arrives at the downstream conveying device is achieved under the condition that lifting movement of the paper toward the print head is prevented by electrostatic attraction.

According to the second aspect of the invention, the printing of the trailing end portion of the paper after completion of conveyance of the trailing end of the paper by the upstream conveying device is achieved under the condition that lifting movement of the paper toward the print head is prevented by electrostatic attraction.

According to the third aspect of the invention, both the printing of the leading end portion of the paper during the time before the leading end of the paper arrives at the downstream conveying device and the printing of the trailing end portion of the paper after completion of conveyance of the trailing end of the paper by the upstream conveying device are achieved under conditions that lifting movement of the paper is prevented by electrostatic attraction.

DESCRIPTION OF THE PREFERRED EMBODIMENTS

Figure 1:
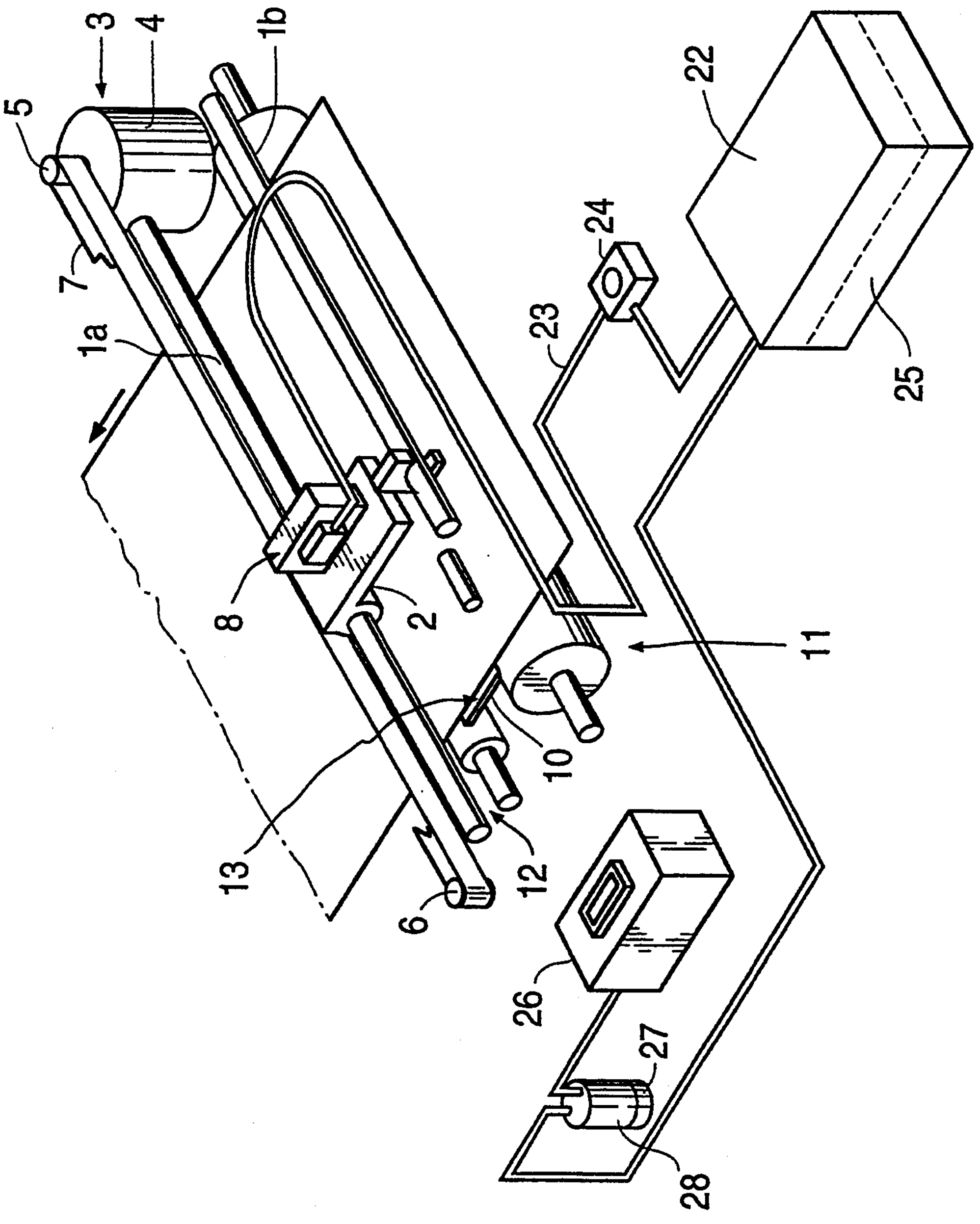
FIG 1 is a perspective view showing a printing apparatus in an ink jet printer.
Figure 2:
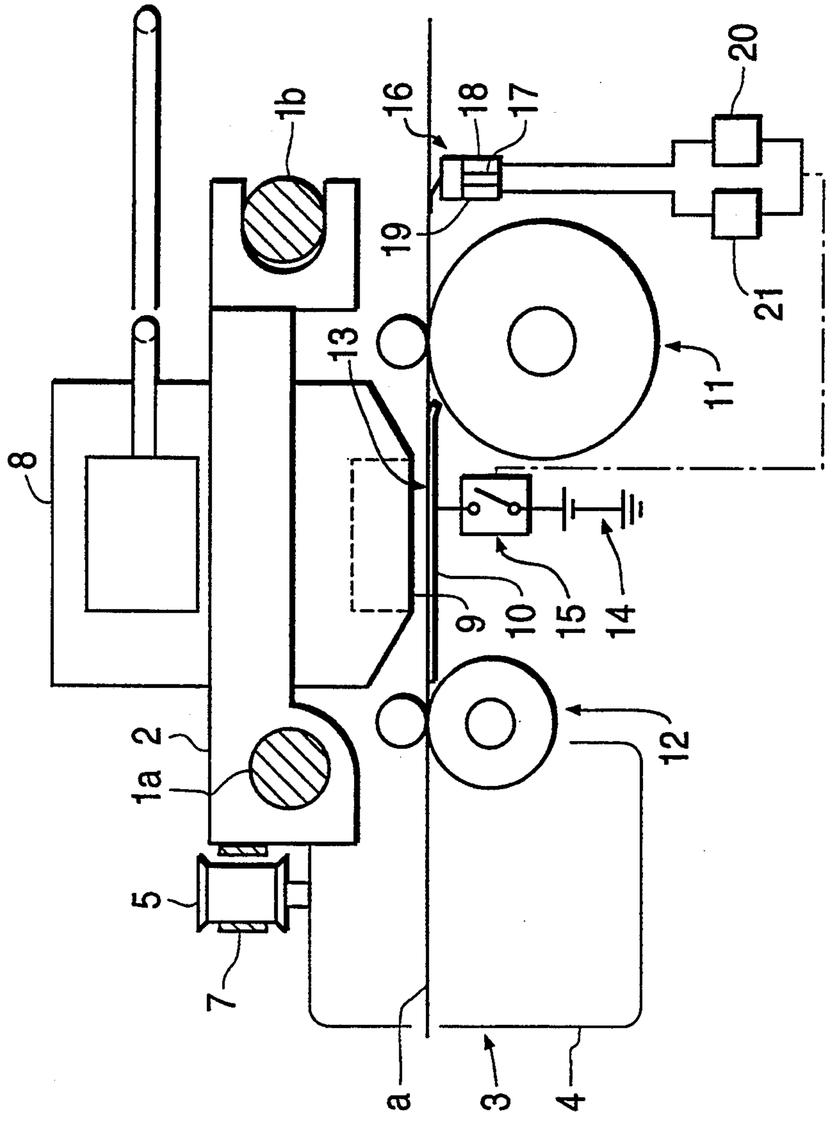
FIG. 2 is a side view of the printing apparatus.

The preferred embodiments of the invention will be described below with reference to the drawings. FIGS. 1 and 2 show a printing apparatus in an ink jet printer.

Referring to FIGS. 1 and 2, reference numerals 1*a* and 1*b* designate carriage stays arranged parallel to each other, and a carriage 2 is positioned to be reciprocally movable along carriage stays 1*a* and 1*b*. Reference numeral 3 designates carriage-moving means. An endless belt 7 is wound over a pair of pulleys 5 and 6 with one of which a motor 4 is connected, and carriage 2 is connected with a part of belt 7. Reference numeral 8 designates a printing head mounted on the carriage 2, and a platen sheet 10 is arranged to face a printing portion 9 of printing head 8.

Reference numerals 11 and 12 designate conveying devices, each including a pair of an upper roller and a lower roller, respectively arranged on the upstream side and on the downstream side, in a conveying direction of a paper, of platen sheet 10. Upstream conveying device 11 continuously conveys a paper (a) until a leading end of the paper (a) arrives at printing portion 9 of the printing head 8, while downstream conveying device 12 continuously conveys the paper (a) after a trailing end of the paper (a) has passed through or beyond the printing portion 9. Conveying action is stopped intermittently when the paper (a) is printed during a conveyance other than those described above. If printing is completed midway of the length of the paper (a), both the conveying devices 11 and 12 continuously convey the paper (a).

Reference numeral 13 designates an electrostatic attraction or maintaining member provided on a surface of platen sheet 10 directed toward and corresponding to the printing portion 9 to electrostatically attract the paper (a) by an application of a voltage. Attraction increases as the voltage is increased. Reference numeral 14 designates a power source for electrostatic attraction member 13 and its electric circuit is provided with a switch 15.

Reference numeral 16 designates a sensor arranged slightly upstream of the upstream conveying device 11 and operable to detect the leading end and trailing end of a paper (a). Sensor 16 includes a detector 17 to determine the arrival at a printing position of a first line to be printed at the leading end of the paper (a) on the basis of counting of a predetermined number of pulses after the leading end of the paper (a) was detected by sensor 16, a detector 18 to determine the arrival of the leading end of the paper (a) at the downstream conveying device 12 on the basis of a predetermined number of pulses after the leading end of the paper (a) was detected, and a detector 19 to determine completion of conveyance of the trailing end of the paper (a) by the upstream conveying device 11 on the basis of counting of a predetermined number of pulses after the trailing end of the paper (a) was detected by sensor 16.

Reference numeral 20 designates a first control to apply a voltage to the electrostatic attraction member 13 during printing by closing switch 15 until receipt of a signal from detector 18 that the leading end of the paper (a) has arrived at downstream conveying device 12. Reference numeral 21 designates a second control to apply a voltage to the electrostatic attraction member 13 during printing by closing switch 15 upon receipt from detector 19 of a signal that conveyance of the trailing end of the paper (a) by the upstream conveying device 11 has been completed.

The voltage is applied to the electrostatic attraction member 13 by source 14 upon closing of switch 15 by first and second controls 20, 21 to thereby electrostatically attract the paper (a) to the electrostatic attraction member 13. The leading end portion and trailing end portion of the paper (a) are printed under the condition that the spacing or interval between the printing portion 9 of the printing head 8 and the surface to be printed of the paper (a) is regulated.

Reference numeral 22 designates an ink cartridge. Reference numeral 23 designates an ink line extending from ink cartridge 22 to the printing head 8 and is provided with a residual ink detector 24. Reference numeral 25 designates a waste ink cartridge. Reference numeral 26 designates a delivery and recovery device with which a pump 28 driven by a direct current motor 27 is connected.

A series of printing operations including printing of the leading end portion and trailing end portion of the paper by a printing device having the above described construction now will be described with reference to FIGS. 3 to 5.

Figure 3:
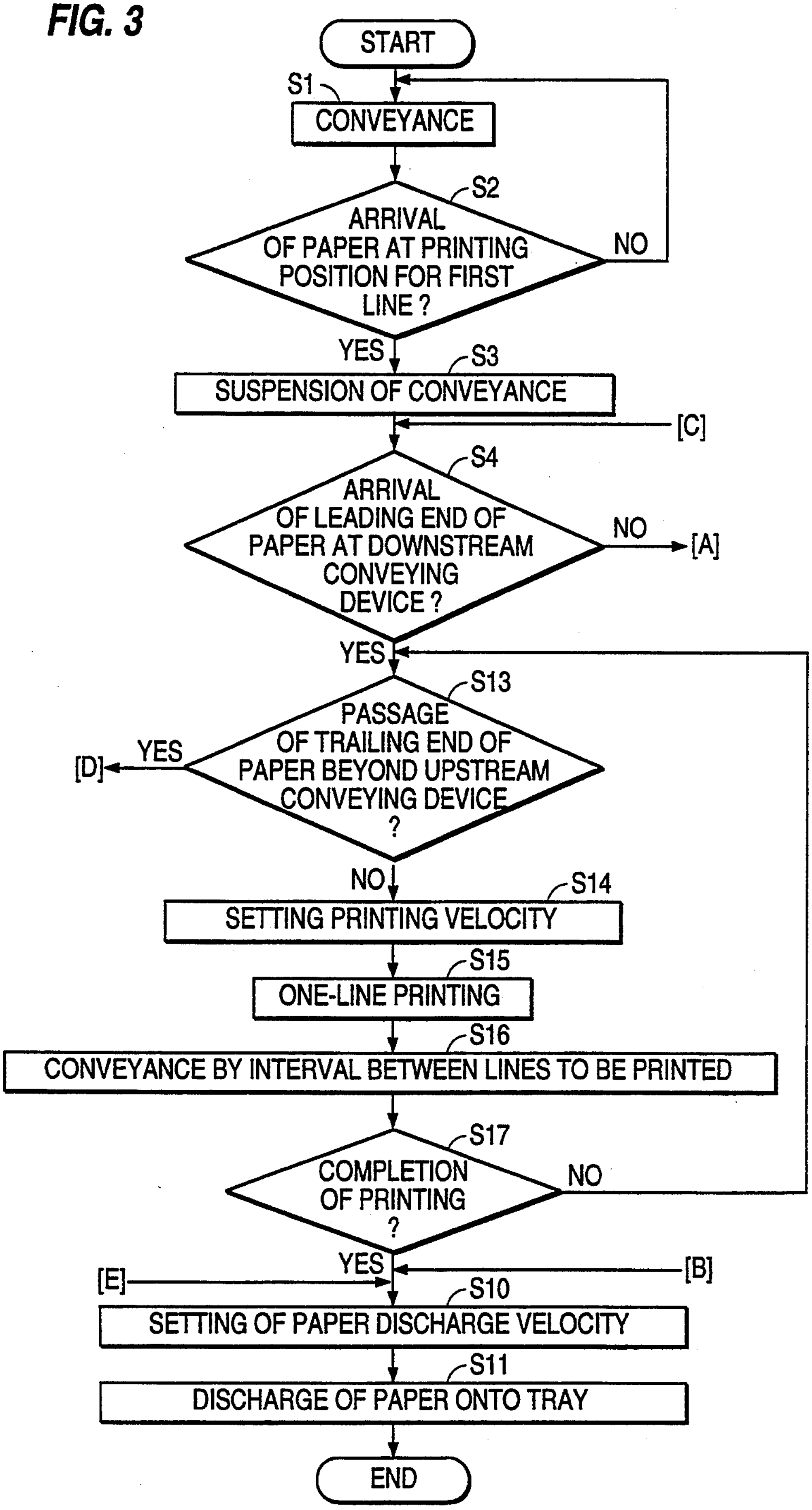
FIG. 3 is a flow chart showing a printing attitude under the condition that a paper is conveyed by both upstream and downstream conveying devices.

At first as shown in FIG. 3, a print switch is operated to start paper conveyance (Step S1). The arrival at the printing position of printing portion 9 of the portion of the paper surface corresponding to the first line at the leading end of the paper is determined by the detector 17 (Step S2), and conveyance is stopped (Step S3).

Figure 4:
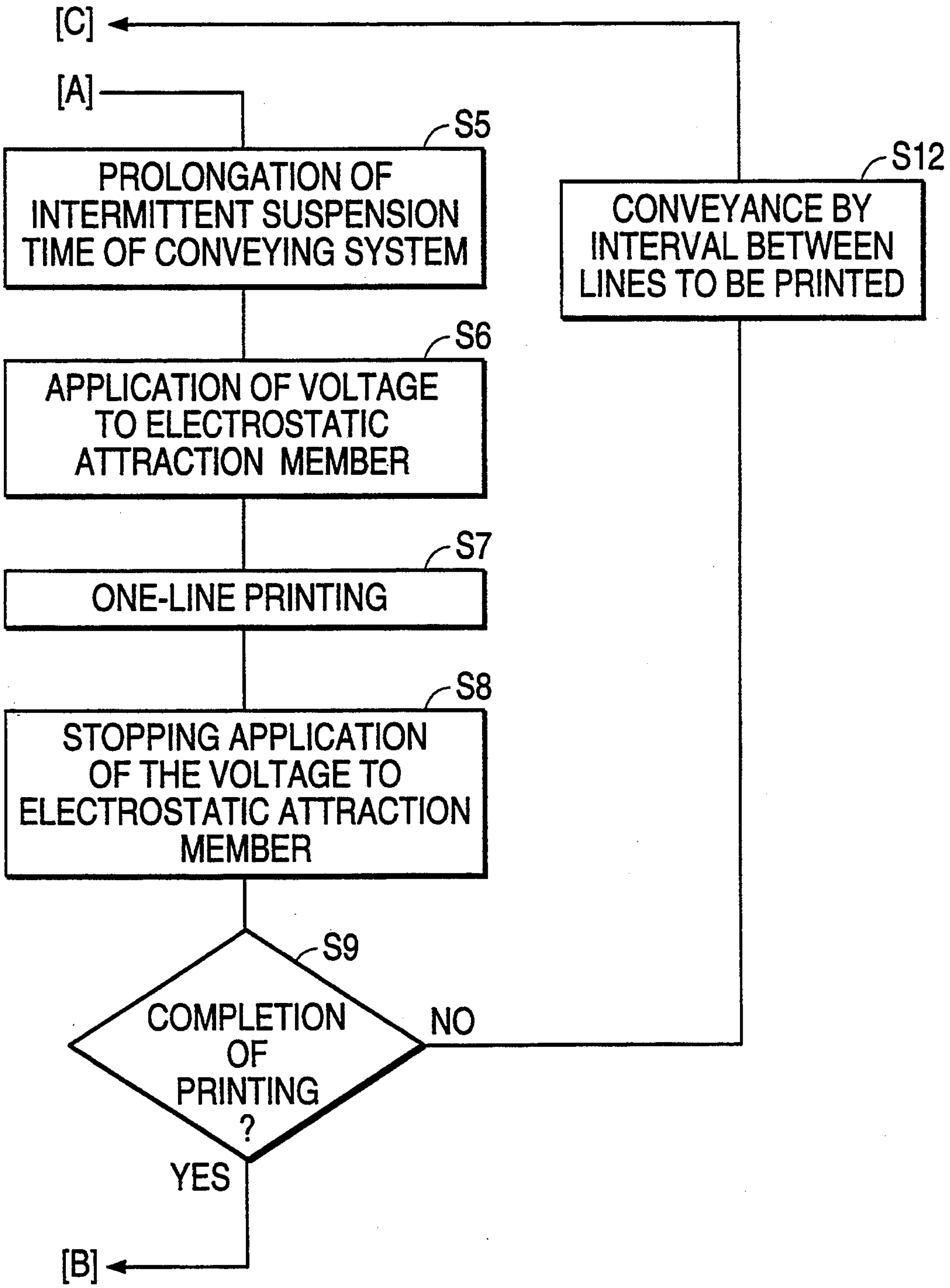
FIG. 4 is a flow chart showing a printing attitude under the condition that a paper is conveyed by an upstream conveying device.

When it is confirmed by sensor 18 that the leading end of the paper has not yet arrived at the downstream conveying device 12 (Step S4), the process is shifted to [A] in FIG. 4 to carry out a one-line printing operation (Step S7). Then, an intermittent conveyance by an amount equal to an interval between lines to be printed is carried out by the upstream conveying device 11 (Step S12). However, at this time the conveying system of conveying device 11 is switched to a conveying attitude of prolonging the time of suspension (Step S5) so that start of the intermittent conveyance after the one-line printing operation and start of the next printing operation after the suspension of printing are slightly delayed, compared with ordinary printing. That is, the time period of conveyance suspension during intermittent printing is slightly prolonged compared with that of ordinary printing.

The switch 15 is switched on by the first control 20 for a predetermined period of time to apply voltage to the electrostatic attraction member 13 (Step S6). Thereby, the leading end portion of the paper is electrostatically attracted to the platen sheet 10 by member 13. At the same time, the printing of the first line on the leading end portion of the paper (Step S7) is carried out under this electrostatic attraction condition. After such printing, the switch 15 is switched off to cut the application of the voltage to the electrostatic attraction member 13 (Step S8).

If printing of the paper is completed by printing of merely such one line, this is confirmed by Step S9 to return the process to [B] in FIG. 3, whereby the conveying systems of the conveying devices 11, 12 are switched to a paper discharging attitude at a velocity suitable for discharging the paper (Step S10) to discharge the paper onto a paper discharge tray (not shown) (Step S11). However, if further printing is to occur, conveyance of the paper by the interval between lines to be printed is carried out by the upstream conveying device 11 (Step S12 in FIG. 4).

Referring again to FIG. 3, when it is confirmed (at Step S4) that the paper has not arrived at the downstream conveying device 12, the above described printing under the electrostatic attraction condition and intermittent conveyance under the non-attraction condition are repeated.

On the other hand, when the arrival of the leading end of the paper at the downstream conveying device 12 by the above described conveyance is confirmed by detector 18 (Step S4), the paper is conveyed by both conveying devices 11 and 12 by switching the conveying systems of both conveying devices 11 and 12 to a velocity of intermittent conveyance suitable for ordinary high-speed printing (Step S14). This occurs until completion of conveyance of the trailing end of the paper by upstream conveying device 11 is confirmed by detector 19 (Step S13).

During paper conveyance by both devices 11, 12 electrostatic attraction of the paper by the electrostatic attraction member 13 is not carried out, and one-line printing (Step S15) and conveyance by one interval between lines to be printed (Step S16) are repeated until completion of conveyance of the trailing end of the paper by upstream conveying device 11 is confirmed by detector 19 (Step S13), except for a situation wherein completion of the printing is first confirmed (Step S17), whereupon a paper discharging operation then occurs (Step S10).

Figure 5:
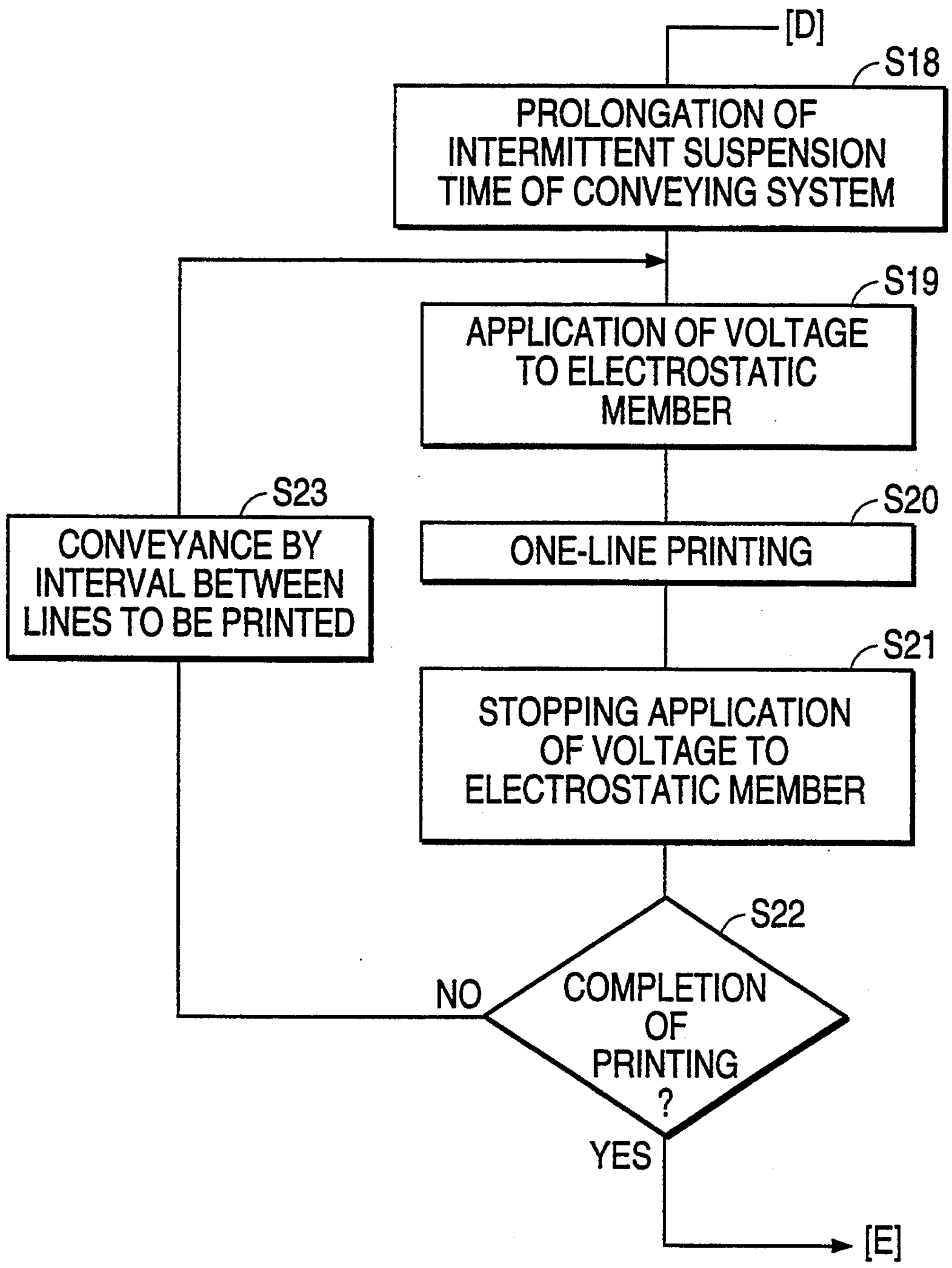
FIG. 5 is a flow chart showing a printing attitude under the condition that a paper is conveyed by a downstream conveying device.

When completion of conveyance of the trailing end of the paper by upstream conveying device 11 is confirmed by detector 19 (Step S13), the process is shifted to [D] in FIG. 5 to switch the conveying system of conveying device 12 to the conveying attitude of prolonging the time of suspension (Step S18) in the same manner as in the Step S5. Switch 15 is switched on for predetermined time intervals by the second control 21, until the completion of printing as confirmed at Step S22, to apply voltage to the electrostatic attraction member 13 (Step S19). Thereby, the trailing end of the paper is electrostatically attracted to and maintained on the platen sheet 10 by electrostatic attraction member 13. One-line printing at the trailing end portion of the paper occurs under such electrostatically attracted condition (Step S20). Switch 15 is switched off to stop application of voltage to the electrostatic attraction member 13 (Step S21) to enable intermittent conveyance by the interval between lines to be printed (Step S23).

When completion of printing of the paper is confirmed at Step S22, the process is returned to [E] in FIG. 3 to switch the conveying systems of the conveying devices 11 and 12 (at least device 12) to the paper discharging attitude (Step S10), thereby discharging the paper onto the paper discharge tray (not shown) (Step S11).

According to the above described construction, the leading and trailing end portions of the paper are electro-statically attracted to the member 13 and maintained on the platen sheet or plate 10. Thereby, printing of such portions is carried out under the condition that the interval or spacing between the printing portion 9 and the paper surface to be printed is regulated during printing. This occurs before arrival of the leading end of the paper at the downstream conveying device 12 is confirmed by detector 18 and after completion of conveyance of the trailing end of the paper by upstream conveying device 11 is confirmed by detector 19.

At such times, the start of printing is slightly delayed compared with ordinary printing. Thus, it is guaranteed that printing is carried out only after the paper is attracted to and maintained in position by the electrostatic attraction member 13. Thereby, it is possible to achieve satisfactory printing at the leading and/or trailing end portions of the paper without disturbance of printing at such portions.

In addition, the start of intermittent conveyance after such printing is slightly delayed compared with ordinary printing. Thus, it is guaranteed that the electrostatic attraction power of member 13 surely is eliminated within such the time so that the paper easily can be moved along the sheet or plate 10, thereby achieving smooth conveyance of the paper after printing.

Furthermore, electrostatic attraction of the paper by the member 13 also is not carried out during the time of printing with intermittent conveyance achieved by both conveying devices 11 and 12. However, the paper may be electrostatically attracted during printing at such time as occasion demands.

Furthermore, the prolongation of the time of suspension of intermittent conveyance ensures sufficient time for the electrostatic attraction member 13 to achieve a required electrostatic attraction power and sufficient time for the influence of the attraction to the member 13 to be eliminated during printing for the leading end portion and trailing end portion of the paper. However, it goes without saying that such prolongation is not required if the conveying velocity during ordinary printing is a satisfactory velocity for intermittent conveyance during printing of such end portions.

Figure 6:
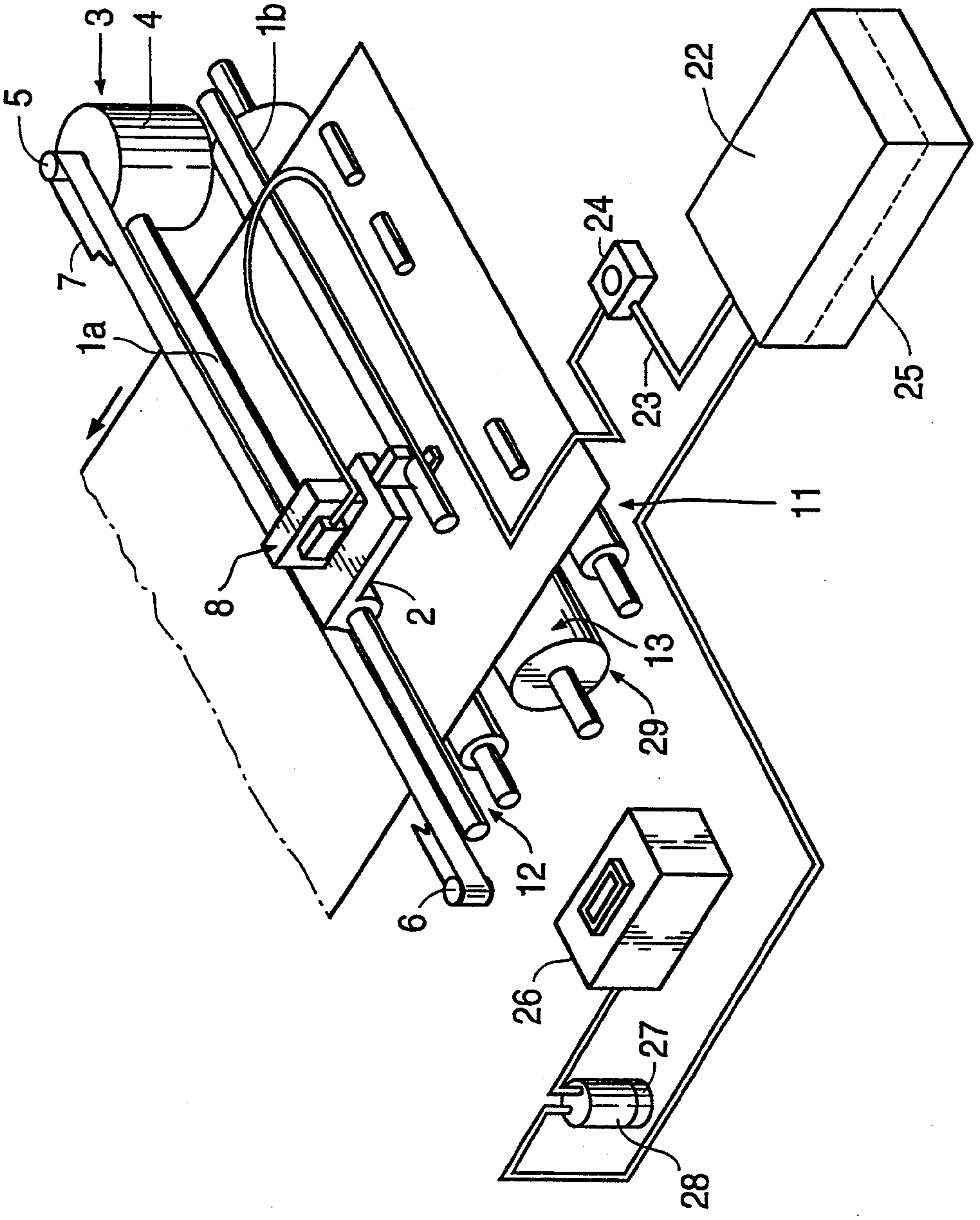
FIG. 6 is a perspective view showing a printing apparatus in an ink jet printer according to another preferred embodiment.
Figure 7:
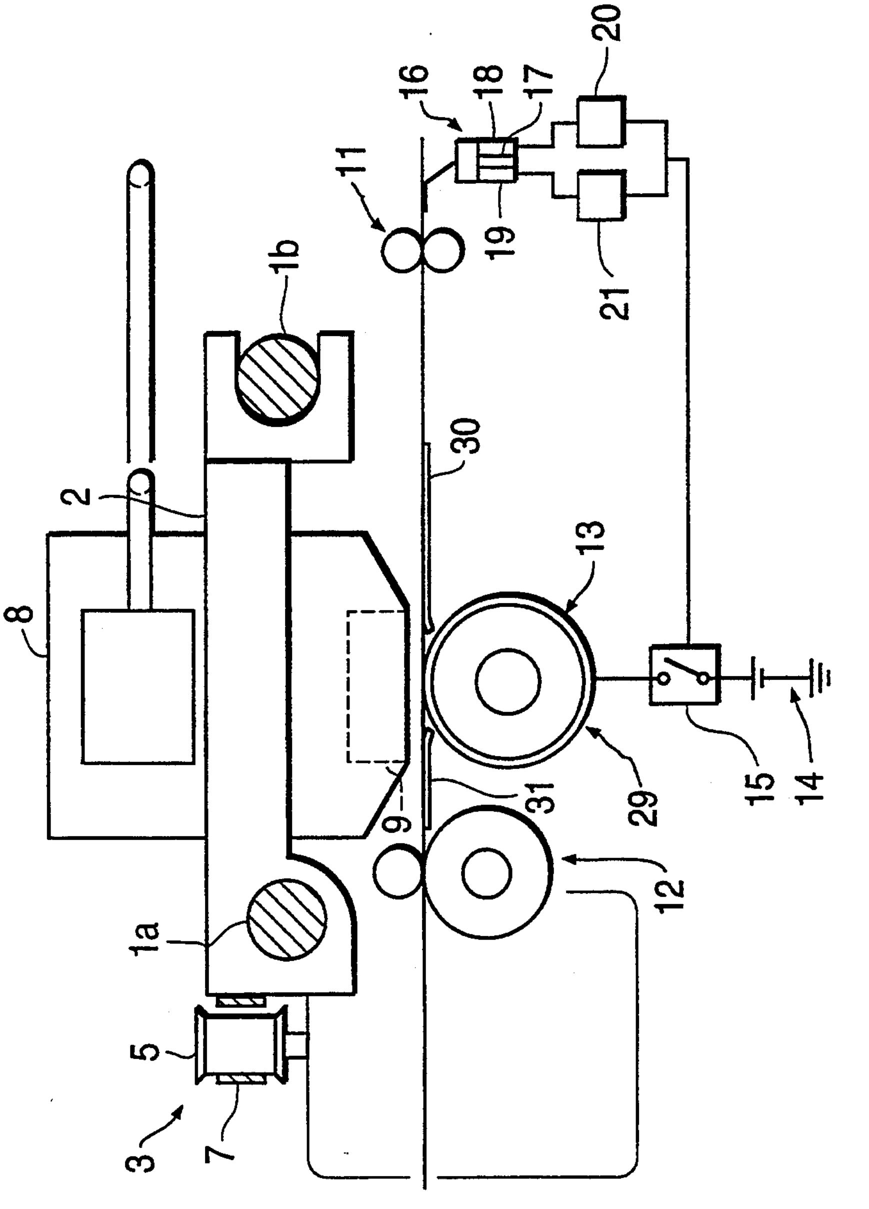
FIG. 7 is a side view of such printing apparatus.

FIGS. 6 and 7 show a printing apparatus according to another preferred embodiment of the invention and for an ink jet printer. In this embodiment, a platen roller 29, the drive of which is stopped during printing of a line, is arranged so as to face to the printing head 8. Platen roller 29 is provided on a circumferential surface thereof with electrostatic attraction member 13. Guide plates 30 and 31 are arranged on the upstream side and the downstream side, respectively, as seen in the direction of the conveyance of the paper, of the platen roller 29.

The first control 20 is adapted to switch on the switch 15 during the printing at least until the information from the first sensor 18 is put in. Concretely speaking, it is adapted to switch on the switch 15 merely during the printing until the pointed end of the paper (a) is supported by said guide plate 31 on the downstream side over the platen roller 29 and then continuously switch on the switch 15 until the conveyance of the rear end of the paper (a) by the conveying means 11 on the upstream side is completed.

On the other hand, the second control means 21 is adapted to receive the information of the completion of the conveyance of the rear end of the paper by the conveying means 11 on the upstream side from the second sensor 19 and switch on the switch 15, whereby applying the voltage to the electrostatic absorbing member 13, during the printing until the rear end of the paper (a) goes over the platen roller 29, so that the operation of the second control means 21 can be carried out by the information from the first sensor 18.

Since other constructions of this embodiment are the same as in the printing apparatus shown in FIGS. 1 and 2, further description thereof is omitted.

A series of printing operations including printing of the leading end portion and trailing end portion of the paper of the printing apparatus having the above described construction according to this preferred embodiment now will be described with reference to FIG. 8.

At first, the print switch is operated to start paper conveyance (Step S31). The arrival at the printing position of the portion of the paper surface corresponding to the first line to be printed at the leading end portion of the paper is determined by the detector 17 (Step S32), and conveyance is stopped (Step S33).

At this time, if the leading end of the paper is not supported by the downstream guide plate 31, that is it is confirmed by detector 18 that the leading end of the paper has not yet arrived at the downstream conveying device 12 (Step S34), the switch 15 is switched on for a predetermined time to apply a voltage to the electrostatic attraction member 13 (Step S35), thereby electrostatically attracting the leading end portion of the paper to the electrostatic attraction member 13. At the same time, printing of the first line at the leading end portion of the paper is carried out under the condition that drive of the platen roller 29 is suspended (Step S36). The switch 15 then is opened to stop application of the voltage to the electrostatic attraction member 13 (Step S37).

If the printing of the paper is finished by printing of merely one line, this is confirmed by a Step S38 to discharge the paper onto a discharge tray (not shown) (Step S39). However, if printing is to be further continued, a conveyance of the paper to a position for printing a second line (Step S40) is carried out.

If it is confirmed that the leading end of the paper is not yet supported by the downstream guide plate 31 even by such this conveyance (Step S34), the above operations of printing during electrostatic attraction and conveyance of the paper without attraction are repeated.

On the other hand, when it is confirmed that the leading end of the paper is supported by the downstream guide plate 31 as a result of the above described conveyance (Step S34), the first control 20 functions until the conveyance of the trailing end of the paper by the upstream conveying device 11 is completed and the second control 21 functions until the conveyance of the trailing end of the paper is completed and the trailing end of the paper passes the platen roller 29. Thereby, a continuous application of voltage to the electrostatic attraction member 13 is carried out (Step S41).

During conveyance of the leading end portion of the paper, such leading end portion is supported by the downstream guide plate 31. Thus, the paper can be satisfactorily separated from the platen roller 29, even though the paper is electrostatically attracted thereto, and the operations of one-line printing (Step S42) and conveyance of the interval between lines to be printed (Step S44) are repeated until completion of planned printing is confirmed (Step S43).

When the completion of printing is confirmed (Step S43), the application of voltage to the electrostatic attraction member 13 is stopped (Step S45) to discharge (Step S39) the paper onto a discharge tray (not shown). Thus, it is possible to conduct printing while avoiding unprintable margins at the leading and trailing end portions of the paper.

In addition, after completion of planned printing is confirmed (Step S43), the application of the voltage to the electrostatic attraction member 13 is stopped (Step S45). Also, the application of the voltage may be stopped after the one-line printing of Step S42, and the application of the voltage by Step S41 may be carried out after the conveyance by the interval between lines to be printed of Step S44. Alternatively, the voltage may be reduced without stopping application of the voltage.

Furthermore, a series of printing operations are carried out at the same conveying velocity. However, a conveying operation may include prolonging the time of suspension of conveyance during intermittent conveyance, thereby to ensure that the electrostatic attraction member 13 obtains a necessary electrostatical attraction power, and to ensure that the influence of the attraction of the paper to the member 13 is eliminated.

Also, although the application of the voltage to the electrostatic attraction member 13 is stopped in Steps S8 and S21 as well as Step S37 in the above described respective preferred embodiments, the alternative of reducing rather than stopping the voltage applied to the electrostatic attraction member 13 may be employed, so long as this does not adversely effect conveyance.

In addition, the present invention can be achieved even with elimination of any one of the first control 20 for use in control of printing of the leading end portion of the paper, per Steps S5 to S9 and S12 required for a series of printing operations shown in FIGS. 3 to 5, and the second control 21 for use in control of printing of the trailing end portion, per Steps S18 to S23.

Figure 8:
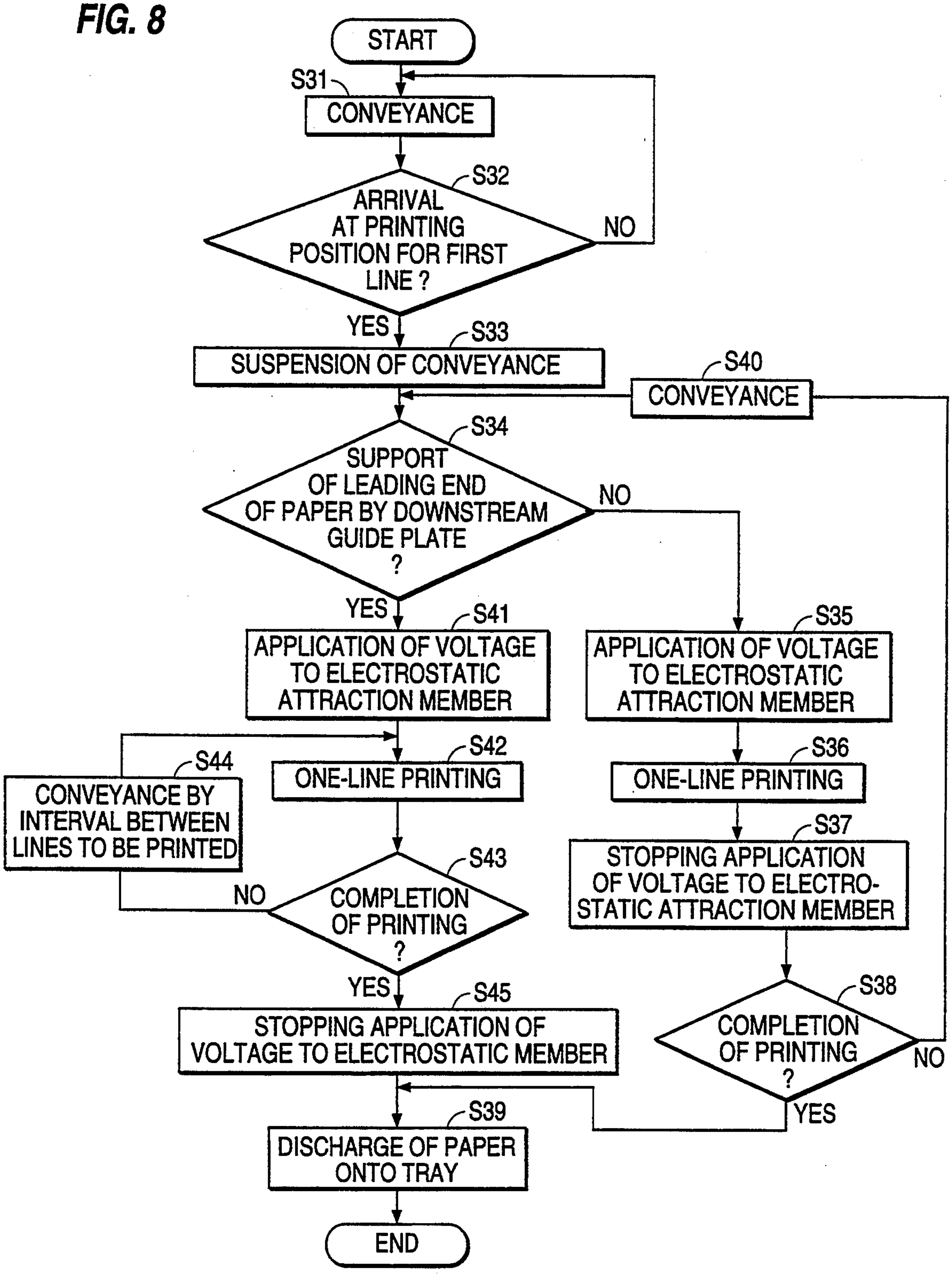
FIG. 8 is a flow chart showing one example of a printing attitude.

Similarly, the present invention can be achieved even with elimination of any one of the first control 20 for use in control of printing of the leading end portion of the paper, per Steps S35 to S38 and S40 shown in FIG. 8, and the second control 21 for control of printing of the trailing end portion of the paper, per Steps S41 to S44 after arrival of the leading end portion at the downstream device 12.

That is to say, in a case where the paper to be printed is, for example, a so-called inter-office letterhead with a company name, the company crest and the like printed at the leading end portion of the paper, then printing is not required at such portion. Thus, it is not a problem that such portion will be an unprintable margin. Therefore, the first control 20 may be omitted, so as to carry out printing after conveyance by the downstream conveying device 12 has started. Similarly, in a case where the paper to be printed is, for example, such so-called inter-office letterhead with the company name, the company crest and the like printed on the trailing end portion of the paper, then printing is not required at such portion. Thus, it is not a problem that such portion will be an unprintable margin. Therefore, the second control 21 may be omitted.

Figure 9:
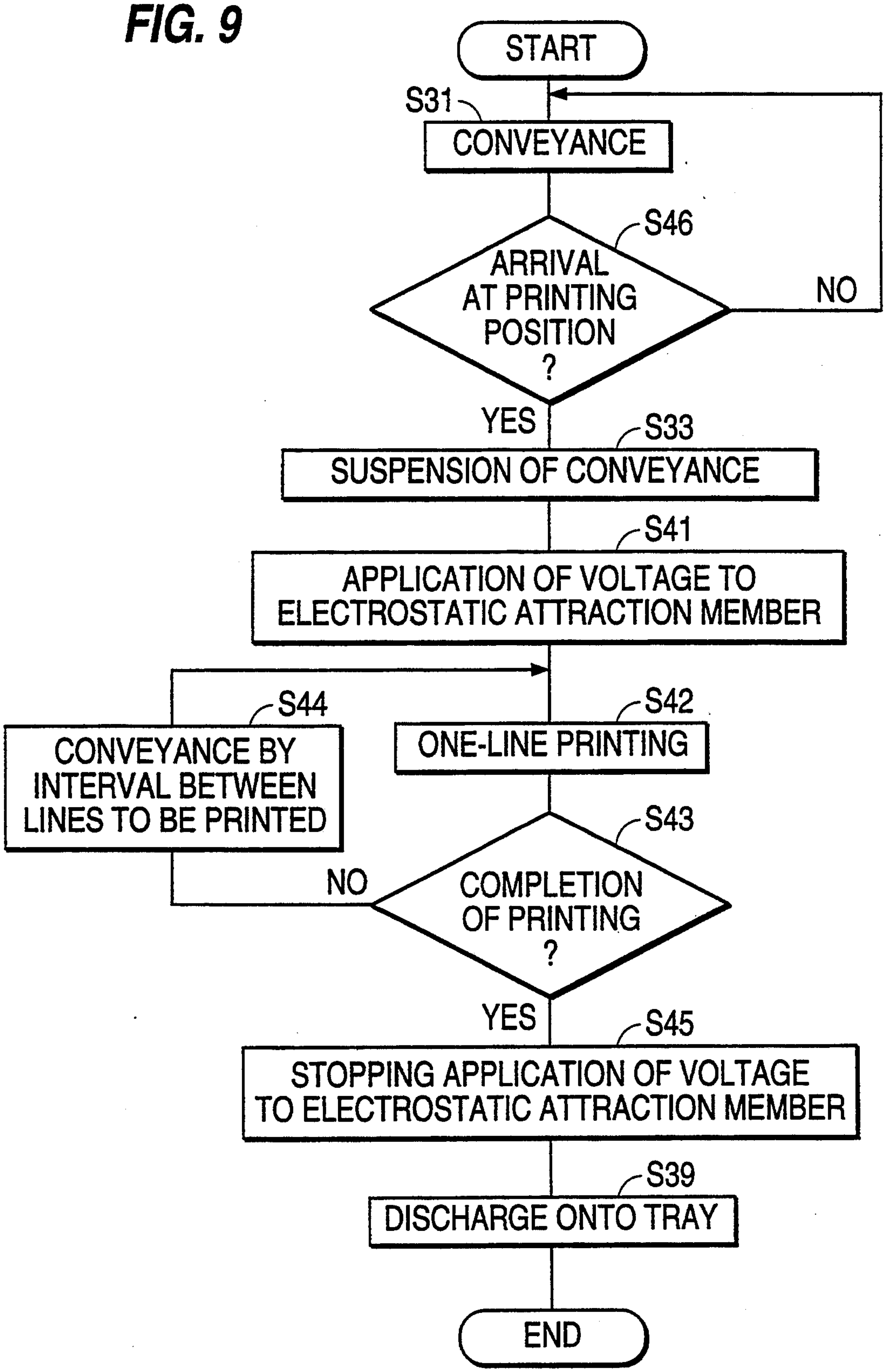
FIG. 9 is a flow chart showing a printing attitude according to still another preferred embodiment in which first control means is omitted.

FIG. 9 is a flow chart showing an example wherein the first control 20 of the control system shown in FIG. 8 is omitted. Here, the Steps S32, S34 to S38 and S40 shown in FIG. 8 are omitted. Also, a Step S46 of confirming whether or not the paper has arrived at the appointed printing position is provided after the conveyance by Step S31 is started. Further, Steps S33, S41 to S45 and S39 are provided after the arrival of the paper at the appointed printing position was confirmed by Step S46.

In addition, the switch 15 is switched on during the time after the conveyance of the paper was started and before the trailing end of the paper is disconnected from the upstream conveying device 11 to continuously apply the voltage to the electrostatic attraction member 13 in the above described embodiment of FIGS. 6–7. However, the voltage may be applied to the electrostatic attraction member 13 only during printing from the time before conveyance of the leading end of the paper by the downstream conveying device 12 is started, and the application of the voltage to the electrostatic attraction member 13 may be completely stopped during the time when the paper is being conveyed by both conveying devices 11 and 12.

As described above, according to the present invention, at least one of printing of the leading end portion of the paper until the leading end of the paper is conveyed by at least the downstream conveying device and printing on the trailing end portion of the paper after the trailing end of the paper is disconnected from the upstream conveying device is achieved. At such times, the paper is attracted by the electrostatic attraction member. Thereby, efficient printing capable of avoiding an unprintable margin on at least one of the leading end portion and the trailing end portion of the paper is possible.

What is claimed is:

1. In an image forming apparatus including a platen to support a paper to be printed, a print head facing said platen to print on a surface of the paper supported thereby, and an upstream paper conveying device and a downstream paper conveying device respectively positioned upstream and downstream of said print head, relative to a direction of conveyance of the paper, to convey the paper intermittently in said direction between said platen and said print head, said conveying devices being inoperable to convey the paper during printing operations by said print head to print the paper and operable to convey the paper between said printing operations, the improvement comprising:

said platen including an electrostatic attraction member operable to, upon application thereto of a voltage, electro-statically attract the paper to said platen;

a control operably coupled to said member to apply said voltage thereto during said printing operations until the paper has been conveyed by said upstream conveying device to a position whereat a leading end of the paper has reached said downstream conveying device; and said upstream conveying device operating such that time periods of intermittent conveyance which occurs prior to an arrival of the leading end of the paper at the downstream conveying device and while voltage is applied to said member are longer than time periods of intermittent conveyance which occurs when the paper is conveyed by both said upstream conveying device and said downstream conveying device.

2. The image forming apparatus claimed in claim 1, wherein said platen comprises a rotatable roller, rotation of which is stopped during said printing operations, and said member is on a circumferential surface of said roller.

3. The image forming apparatus claimed in claim 1, wherein said platen comprises a fixed plate, and said member is on a surface of said plate facing said print head.

4. The image forming apparatus claimed in claim 1, wherein application of said voltage to said member is stopped when both said conveying devices convey the paper.

5. The image forming apparatus claimed in claim 1, wherein application of said voltage to said member is reduced when both said conveying devices convey the paper.

6. In an image forming apparatus including a platen to support a paper to be printed, a print head facing said platen to print on a surface of the paper supported thereby, and an upstream paper conveying device and a downstream paper conveying device respectively positioned upstream and downstream of said print head, relative to a direction of conveyance of the paper, to convey the paper intermittently in said direction between said platen and said print head, said conveying devices being inoperable to convey the paper during printing operations by said print head to print the paper and operable to convey the paper between said printing operations, the improvement comprising:

said platen including an electrostatic attraction member operable to, upon application thereto of a voltage, electro-statically attract the paper to said platen;

a control operably coupled to said member to apply said voltage thereto during said printing operations until the paper has been conveyed by said upstream conveying device to a position whereat a leading end of the paper has reached said downstream conveying device; and said control being operable to stop application of said voltage to said member when both said conveying devices convey the paper.

7. In an image forming apparatus including a platen to support a paper to be printed, a print head facing said platen to print on a surface of the paper supported thereby, and an upstream paper conveying device and a downstream paper conveying device respectively positioned upstream and downstream of said print head, relative to a direction of conveyance of the paper, to convey the paper intermittently in said direction between said platen and said print head, said conveying devices being inoperable to convey the paper during printing operations by said print head to print the paper and operable to convey the paper between said printing operations, the improvement comprising:

said platen including an electrostatic attraction member operable to, upon application thereto of a voltage, electro-statically attract the paper to said platen;

a control operably coupled to said member to apply said voltage thereto during said printing operations until the paper has been conveyed by said upstream conveying device to a position whereat a leading end of the paper has reached said downstream conveying device; and said control being operable to reduce application of said voltage to said member when both said conveying devices convey the paper.

8. In an image forming apparatus including a platen to support a paper to be printed, a print head facing said platen to print on a surface of the paper supported thereby, and an upstream paper conveying device and a downstream paper conveying device respectively positioned upstream and downstream of said print head, relative to a direction of conveyance of the paper, to convey the paper intermittently in said direction between said platen and said print head, said conveying devices being inoperable to convey the paper during printing operations by said print head to print the paper and operable to convey the paper between said printing operations, the improvement comprising:

said platen including an electrostatic attraction member operable to, upon application thereto of a voltage, electro-statically attract the paper to said platen;

a control operably coupled to said member to apply said voltage thereto during said printing operations after the paper has been conveyed by said conveying devices to a position whereat a trailing end of the paper has passed beyond said upstream conveying device; and said upstream conveying device operating such that time periods of intermittent conveyance which occurs prior to an arrival of the leading end of the paper at the downstream conveying device and while voltage is applied to said member are long than time periods of intermittent conveyance which occurs when the paper is conveyed by both said upstream conveying device and said downstream conveying device.

9. The image forming apparatus claimed in claim 8, wherein said platen comprises a rotatable roller, rotation of which is stopped during said printing operations, and said member is on a circumferential surface of said roller.

10. The image forming apparatus claimed in claim 8, wherein said platen comprises a fixed plate, and said member is on a surface of said plate facing said print head.

11. The image forming apparatus claimed in claim 8, wherein application of said voltage to said member is stopped when both said conveying devices convey the paper.

12. The image forming apparatus claimed in claim 8, wherein application of said voltage to said member is reduced when both said conveying devices convey the paper.

13. In an image forming apparatus including a platen to support a paper to be printed, a print head facing said platen to print on a surface of the paper supported thereby, and an upstream paper conveying device and a downstream paper conveying device respectively positioned upstream and downstream of said print head, relative to a direction of conveyance of the paper, to convey the paper intermittently in said direction between said platen and said print head, said conveying devices being inoperable to convey the paper during printing operations by said print head to print the paper and operable to convey the paper between said printing operations, the improvement comprising:

said platen including an electrostatic attraction member operable to, upon application thereto of a voltage, electro-statically attract the paper to said platen;

a control operably coupled to said member to apply said voltage thereto during said printing operations after the paper has been conveyed by said conveying devices to a position whereat a trailing end of the paper has passed beyond said upstream conveying device; and said control being operable to stop application of said voltage to said member when both said conveying devices convey the paper.

14. In an image forming apparatus including a platen to support a paper to be printed, a print head facing said platen to print on a surface of the paper supported thereby, and an upstream paper conveying device and a downstream paper conveying device respectively positioned upstream and downstream of said print head, relative to a direction of conveyance of the paper, to convey the paper intermittently in said direction between said platen and said print head, said conveying devices being inoperable to convey the paper during printing operations by said print head to print the paper and operable to convey the paper between said printing operations, the improvement comprising:

said platen including an electrostatic attraction member operable to, upon application thereto of a voltage, electro-statically attract the paper to said platen;

a control operably coupled to said member to apply said voltage thereto during said printing operations after the paper has been conveyed by said conveying devices to a position whereat a trailing end of the paper has passed beyond said upstream conveying device; and said control being operable to reduce application of said voltage to said member when both said conveying devices convey the paper.

15. In an image forming apparatus including a platen to support a paper to be printed, a print head facing said platen to print on a surface of the paper supported thereby, and an upstream paper conveying device and a downstream paper conveying devices respectively positioned upstream and downstream of said print head, relative to a direction of conveyance of the paper, to convey the paper intermittently in said direction between said platen and said print head, said conveying devices being inoperable to convey the paper during printing operations by said print head to print the paper and operable to convey the paper between said printing operations, the improvement comprising:

said platen including an electrostatic attraction member operable to, upon application thereto of a voltage, electro-statically attract the paper to said platen;

a first control operably coupled to said member to apply said voltage thereto during said printing operations until the paper has been conveyed by said upstream conveying device to a position whereat a leading end of the paper has reached said downstream conveying device; and a second control operably coupled to said member to apply said voltage thereto during said printing operations after the paper has been conveyed by said conveying devices to a position whereat a trailing end of the paper has passed said upstream conveying device.

16. The image forming apparatus image claimed in claim 15, wherein said upstream conveying device operates such that time periods of intermittent conveyance which occurs prior to an arrival of the leading end of the paper at the downstream conveying device and while voltage is applied to said member are longer than time periods of intermittent conveyance which occurs when the paper is conveyed by both said upstream conveying device and said downstream conveying device.

17. The image forming apparatus claimed in claim 15, wherein said platen comprises a rotatable roller, rotation of which is stopped during said printing operations, and said member is on a circumferential surface of said roller.

18. The image forming apparatus claimed in claim 15, wherein said platen comprises a fixed plate, and said member is on a surface of said plate facing said print head.

19. The image forming apparatus claimed in claim 17, wherein application of said voltage to said member is stopped when both said conveying devices convey the paper.

20. The image forming apparatus claimed in claim 15, wherein application of said voltage to said member is reduced when both said conveying devices convey the paper.

* * * * *